United States Patent [19]
Cluts

[11] Patent Number: 5,616,876
[45] Date of Patent: Apr. 1, 1997

[54] SYSTEM AND METHODS FOR SELECTING MUSIC ON THE BASIS OF SUBJECTIVE CONTENT

[75] Inventor: Jonathan C. Cluts, Redmond, Wash.

[73] Assignee: Microsoft Corporation, Redmond, Wash.

[21] Appl. No.: 424,781

[22] Filed: Apr. 19, 1995

[51] Int. Cl.$^6$ ............................ G09B 15/06; G09B 15/04; G10H 7/00

[52] U.S. Cl. .................... 84/609; 84/477 R; 434/307 A

[58] Field of Search ........................... 84/609–614, 601, 84/602, 634–638, 477 R, 478; 358/335; 273/433; 379/93, 96, 97, 100; 434/307 A

[56] References Cited

U.S. PATENT DOCUMENTS

| 5,250,745 | 10/1993 | Tsumura | 84/609 X |
| 5,454,723 | 10/1995 | Horii | 84/601 X |
| 5,486,645 | 1/1996 | Suh et al. | 84/610 |

OTHER PUBLICATIONS

*The Big Picture,* "Introducing Digital Music Express", Georgia Cable TV & Communications, Apr. 1995.
*More Like This,* "Get More of What Your're Looking For", Lexis–Nexis, 1995.

Primary Examiner—Stanley J. Witkowski
Attorney, Agent, or Firm—Jones & Askew

[57] ABSTRACT

An interactive network provides music to subscribers. A "more like" function allows a subscriber to use a seed song to identify other songs that are similar to the seed song, and to add the new songs to the current playlist. The similarity between songs is based on the subjective content of the songs, as reflected in style tables prepared by editors. The subscriber may control the closeness of the match by adjusting a style slider provided by the user interface. A style equalizer employs eight faders that indicate the predominant styles of the songs in the playlist. A subscriber may use the style equalizer to see what types of songs are included in the playlist, and to adjust the mix of songs that are played from the playlist.

45 Claims, 8 Drawing Sheets

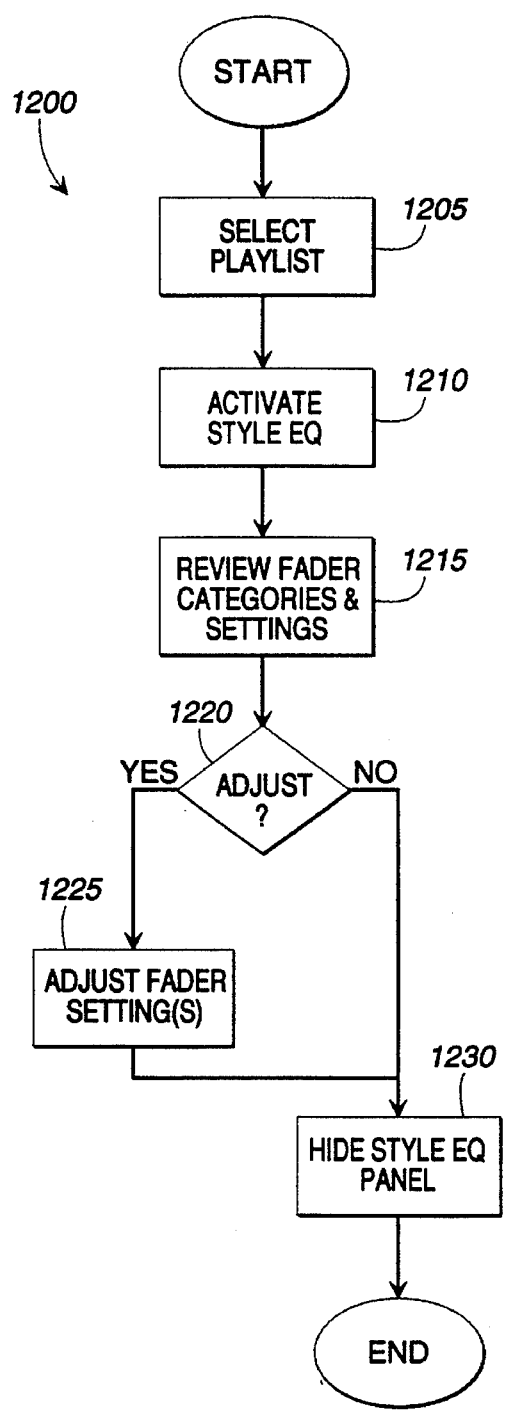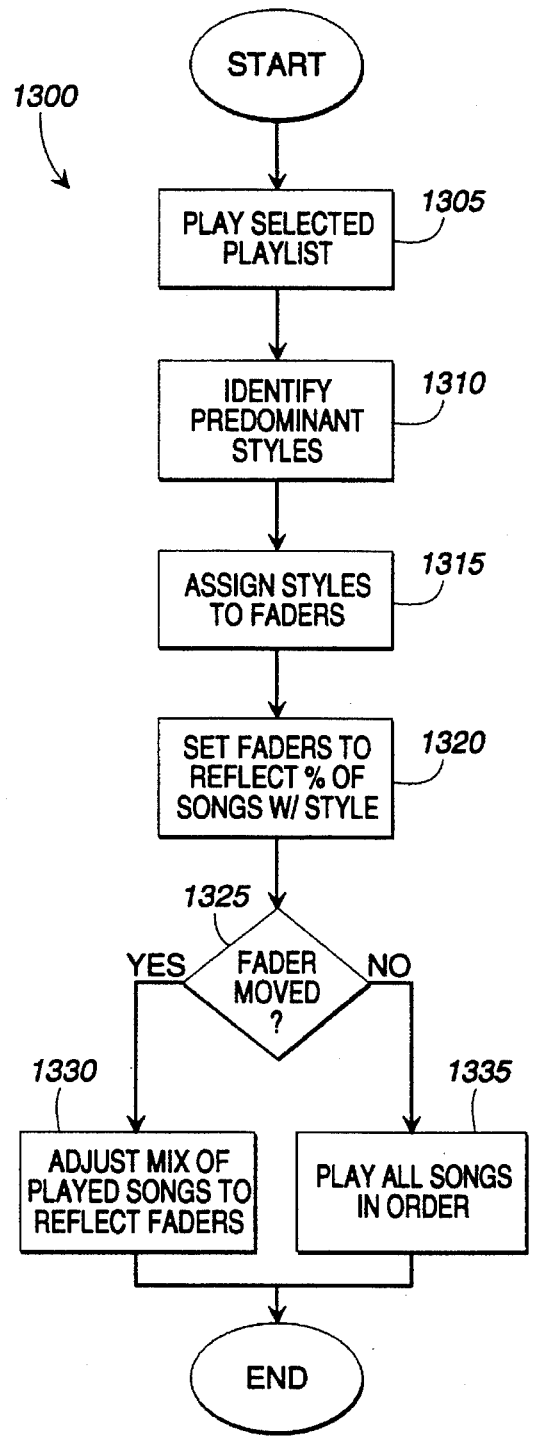
FIG. 12
FIG. 13

SYSTEM AND METHODS FOR SELECTING MUSIC ON THE BASIS OF SUBJECTIVE CONTENT

TECHNICAL FIELD

The present invention relates to systems and methods for selecting and playing audio selections, and more particularly relates to methods for selecting and playing audio selections on the basis of their subjective content.

BACKGROUND OF THE INVENTION

The expansion and improvement of cable television systems (sometimes referred to as community antenna television or CATV systems) have made it possible for cable companies to provide a variety of programming services to subscribers. These services typically include a multitude of television channels that are viewed on the subscriber's television. Some cable companies also provide music channels that are connected to a subscriber's stereo system through a subscriber terminal.

Although CATV systems were originally designed to distribute television signals in the "downstream" direction only (i.e., from a central "headend" location to multiple subscriber locations, which is also known as the "forward" path), the advent of pay-per-view services and of other interactive television applications has fueled the development of bidirectional or "two-way" cable systems. These two-way cable systems also provide for the transmission of signals from the subscriber locations back to the headend via an "upstream" direction or a "reverse" path.

By upgrading conventional CATV systems to increase their bandwidth, cable service providers can use the additional channels gained by this wider bandwidth network to provide many new subscriber services. The ever-expanding deployment of fiber optic technology supports the implementation of an "interactive network" that allows a subscriber to obtain desirable services or programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive music channels, interactive computing, shopping, entertainment, and other related services.

An interactive network makes it possible for subscribers to have immediate access to vast selections of music. For example, record companies may provide catalogs of their music for subscribers to listen to via an interactive network. Similarly, various publishers may compile playlists of various styles of music (e.g., Jazz, Classical, Top 40, etc.) that will be available to subscribers via an interactive network.

When music catalogs are available via an interactive network, a subscriber must have a way to select the music he or she would like to listen to. The computers that form a part of an interactive network facilitate selection by song title, artist, or album name. As in a record store, music may also be classified and searched by style (e.g., Jazz, Classical, Top 40, etc.). Thus, in an interactive network, it will be very simple for a subscriber to select a specific song.

However, unless a subscriber is familiar with a particular artist or song title, there is no simple way to identify other music that the subscriber may enjoy. Because of the subjective nature of such a decision, there is no simple way for a subscriber to identify additional music that is similar to a song he or she likes. This is a significant disadvantage in an environment where a large assortment of music is readily available.

When a listener browses published playlists, the playlists are typically described by a short title, such as Jazz, Classical, Top 40, Progressive Rock, etc. When a subscriber listens to such a playlist, there is no simple way for the subscriber to get a clearer idea of the specific types of music that are included in the playlist. Similarly, there is no simple way for a subscriber to alter the mix of the songs that are played back from the playlist.

In summary, there is no simple, effective way for a subscriber to identify and select music he or she is likely to enjoy on the basis of the music's subjective content and its similarity to a song the subscriber is familiar with. Furthermore, there is no way for a user to quickly assess the mix of music included in a playlist and to alter the mix of music played from the playlist.

Therefore, there is a need in the art for a system that allows a subscriber to pick a song he or she likes and to then identify additional songs that include similar subjective content. Likewise, there is a need in the art for a system that allows a user to perceive the content of a playlist and alter the mix of songs played from the playlist.

SUMMARY OF THE INVENTION

The present invention satisfies the above described needs by providing systems and methods for selecting and playing music based on its subjective content.

Generally described, the present invention provides a method for selecting programming information items in an interactive media distribution system that includes a server, a distribution network, an output device and an input device. The method includes storing on the server a plurality of programming information items and editorial data associated with the programming information items. An initial programming information items is played in response to a first input signal. In response to a second input signal, a list of proposed new programming information items is created on the basis of the editorial data associated with the initial programming information item and the plurality of programming information items. The list of proposed new programming information items is presented on the output device. The proposed new programming information items are then added to a playlist in response to a third input signal.

The present invention also provides a method for classifying and selecting programming information items having subjective content. A plurality of programming information items and editorial data associated with the programming information items are stored. The editorial data includes a plurality of categories and weightings associating each programming information item with the categories. An initial programming information item is selected in response to a first input signal. The setting of a matching closeness indicator is determined in response to a second input signal. The method determines matching categories for the initial programming entry. The matching categories include the categories whose weightings correspond to the position of the matching closeness indicator. The method determines matching programming information items based on the initial programming information item. The matching items include the matching categories with weightings corresponding to the setting of the matching closeness indicator. The matching items are presented to the user.

The present invention also provides a system for classifying and selecting programming information having subjective content. The system includes a data storage device containing a plurality of programming information items and editorial data associated with the programming information items, an output device for providing information to a user, an input device for receiving input from the user, and a computer associated with the data storage device. The computer is configured to play an initial programming information item in response to a first input signal. The computer creates a list of proposed new programming information items on the basis of the editorial data associated with the programming information items in response to a second input signal. The list of proposed new programming information items is presented on the output device. Finally, the proposed new programming information items are added to a playlist in response to a third input signal.

In another aspect, the present invention provides a method for indicating the mix of programming information included in a playlist and adjusting the mix of programming information played from the playlist. The method includes loading a playlist including a plurality of programming information items and loading editorial data associated with the programming information items. A predetermined number of indicators are displayed on the output device. Each of the indicators is associated with a category from the editorial data. The indicators are positioned to indicate the portion of the plurality of programming information items corresponding to each of the categories. At least one of the indicators is adjusted in response to an input signal from an input device. In response to the adjustment of one or more indicators, the method selects programming information items from the playlist such that the portions of the selected programming information items associated with each of the categories corresponds to the adjusted positions of the indicators.

It is therefore an object of the present invention to provide a system for classifying and selecting information having subjective content.

It is another object of the present invention to provide a method for the context based selection of subjective material.

It is another object of the present invention to provide a method for adding items having subjective content to a group of items having similar subjective content.

It is another object of the present invention to predict, based on a listener's current choice of music, the choices from an audio content database that are most like the current choice.

It is another object of the present invention to identify other music that is similar to the music a listener is listening to.

It is another object of the present invention to identify more music that is like a current musical selection.

It is another object of the present invention to identify other movies that are similar to a movie a viewer is watching.

It is another object of the present invention to display the types of music are in a playlist.

It is another object of the present invention to allow a user to alter the mix of music that is selected and played from a playlist.

It is another object of the present invention to select various types of programming on the basis of its subjective content.

BRIEF DESCRIPTION OF THE DRAWINGS

FIG. 12 is a flow diagram illustrating the steps taken by a subscriber when using the "style equalizer" function.

FIG. 13 is a flow diagram illustrating the "style equalizer" function as implemented in a program module running on the preferred interactive network.

DETAILED DESCRIPTION OF THE PREFERRED EMBODIMENT

Figure 1:
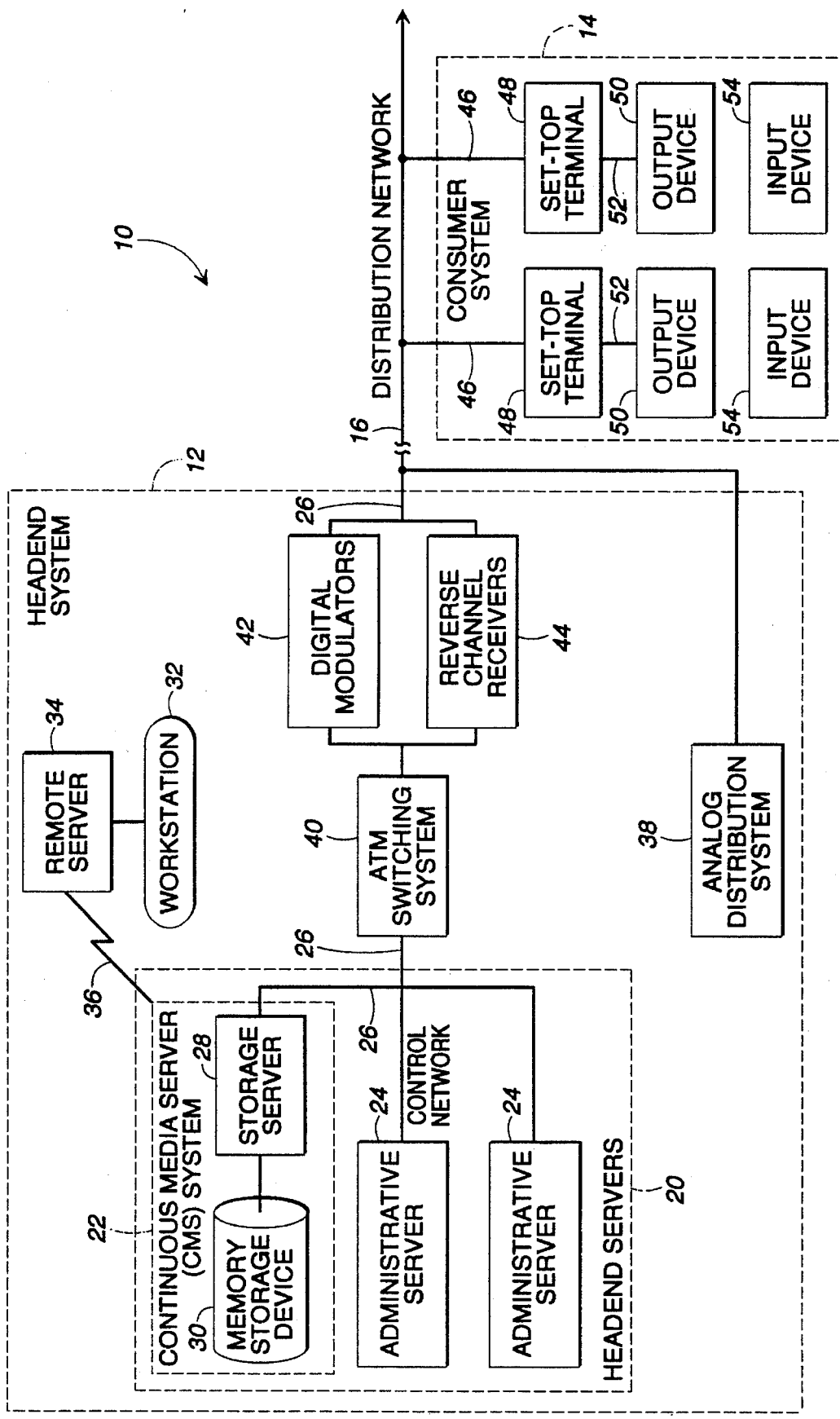
FIG. 1 illustrates an interactive network system.

The preferred embodiment of the present invention is directed to systems and methods for selecting music on the basis of its subjective content, and is implemented in an interactive network system that can deliver a variety of services, including entertainment, information, and transaction services, to consumers via an interactive broadband network. The preferred system, which is referred to as the audio on demand system, allows a subscriber to listen to songs provided by the system. The subscriber may select songs on the basis of title, artist and album. The subscriber may also select playlists, which arc predetermined collections of songs The audio on demand system provides a "more like" function that identifies more music that is like the subscriber's current selection. In addition, the system includes a "style equalizer" that allows a subscriber to see the predominant styles of music included in a playlist, and to adjust the mix of music played from the playlist.

Although the preferred embodiment will be generally described in the context of an interactive television system for delivering broadcast television programs, music, and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that the terms "programming information" and "programming information items" generally include information transmitted electronically to entertain, instruct, educate, or inform the recipient, as well as program modules for supporting these services.

Turning first to the nomenclature of the specification, the detailed description which follows is represented largely in terms of processes and symbolic representations of operations by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environments will be described.

THE OPERATING ENVIRONMENT

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual lines into subscribers' television sets or subscriber set-top terminals, often referred to as "subscriber premises equipment" or "customer premises equipment" ("CPE").

Referring to FIG. 1, an interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data, such as audio and video. On-demand access of digitized data is a particularly desirable characteristic of the CMS system 22 because it allows the interactive network to support the on-demand delivery of various types of programming, such as music, movies, etc. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically includes both video and audio signals. Programming information can be delivered in digital format, analog format, or a combination of both analog and digital formats. For the preferred embodiment, music-related programming is delivered as a stream of digital audio and video signals in a compressed digital data stream, which may include conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a hand held control, a keyboard, a mouse device, a game control, a joystick, a pen or stylus, a trackball, or a track pad.

For the preferred embodiment, the input device 54 is implemented as a hand held remote control unit capable of transmitting infrared signals carrying commands for controlling the operation of the set-top terminal 48. The remote control unit can include a directional keypad having distinct keys for allowing the user to control direction (up, down, left, right) and relative changes in volume or channel (increase or decrease), as well as absolute changes to channel value via a numeric key pad. The remote control unit and its functions are more fully described in conjunction with FIG. 3.

Figure 2:
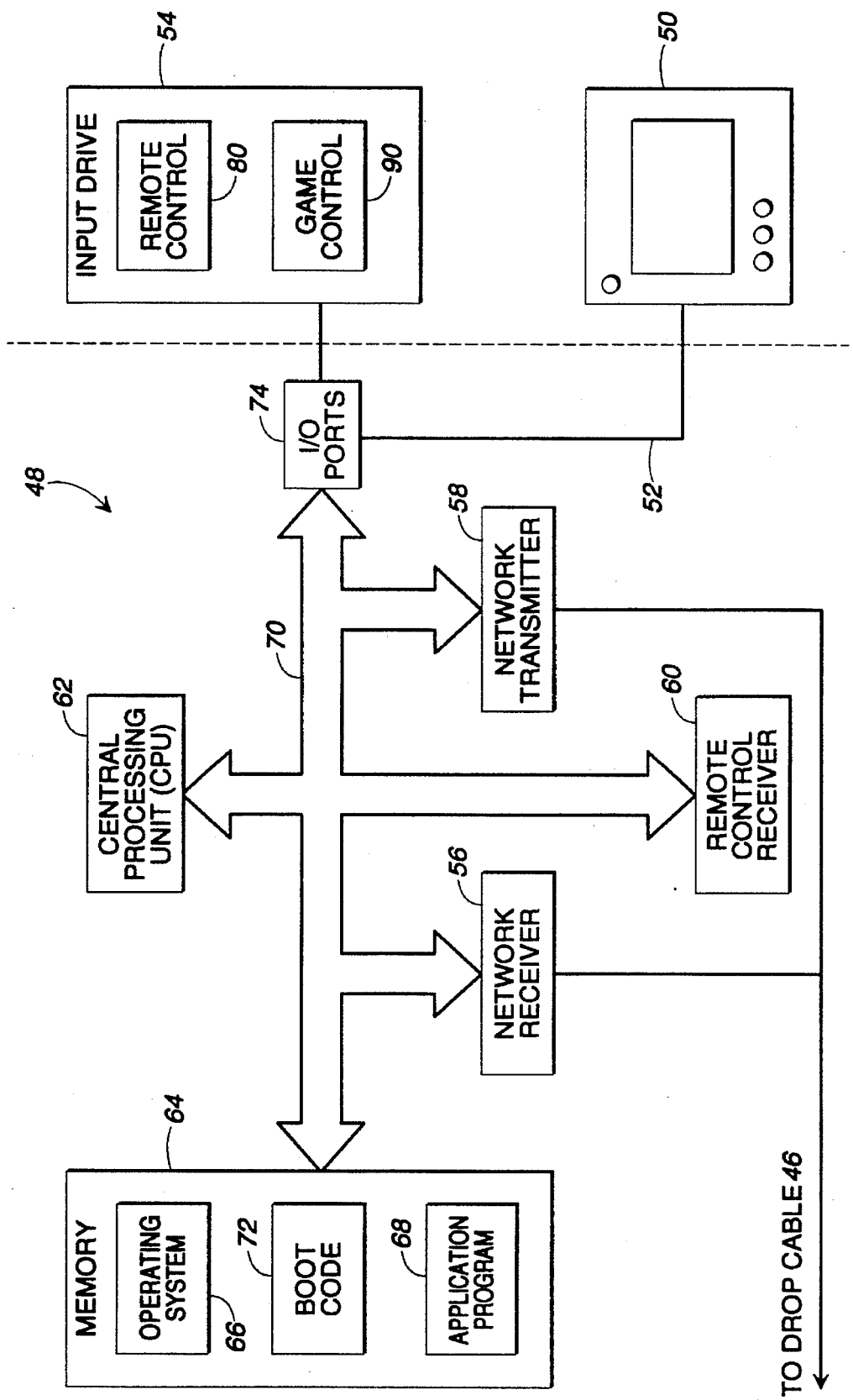
FIG. 2 illustrates a set top terminal, which forms a part of the interactive network system of FIG. 1.

FIG. 2 illustrates the basic components of the set-top terminal 48. The primary components of the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 54, such as a remote control unit 80.

The CPU 62, which is connected to the network receiver and transmitter 56 and 58, as well as to the remote control receiver 60, controls the operations of the set-top terminal 48 and supports the rendering of graphical images that form a part of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item or control object is any visual image that can be manipulated by the user to perform an operation. The operating system 66 can receive and interpret input data supplied by the input device 54, as received by the remote control receiver 60. As described in more detail below, a user can "select" and "activate" (or launch) control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control unit 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control unit 80. In this stand-by mode, the set-top terminal can communicate with the headend system and can respond to administrative requests transmitted by the headend system 12. In the event that a user tunes to an interactive channel (such as the audio on demand service), the set-top terminal 48 changes modes and enters the active mode. In the active mode, the set-top terminal 48 communicates with the headend system 12 to process the instructions transmitted by the remote control unit. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display 50.

Figure 3:
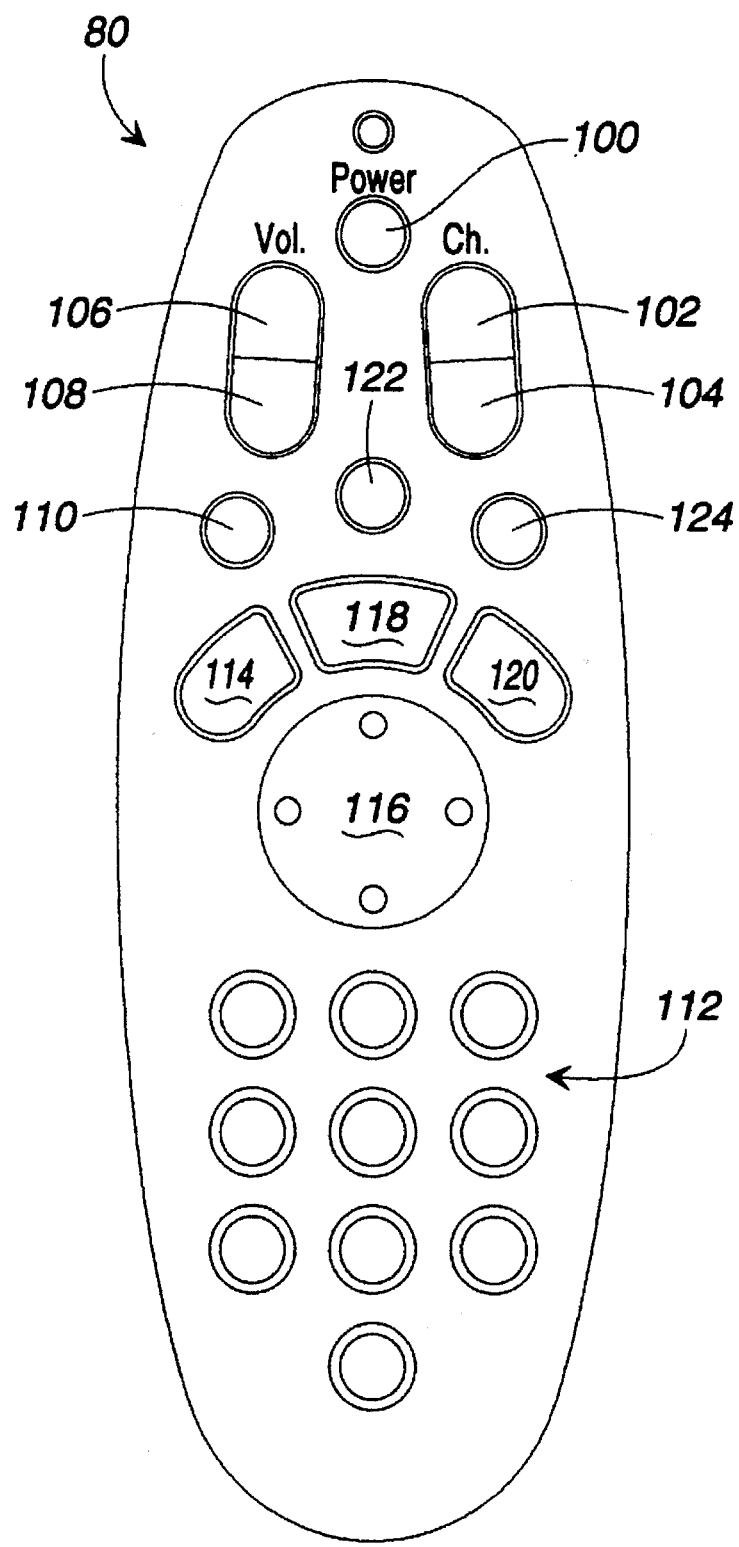
FIG. 3 illustrates the preferred remote control unit for use with the set top terminal of FIG. 2.

FIG. 3 illustrates the preferred remote control unit 80, which is used to transmit commands to the set-top terminal 48. The remote control unit 80 includes a variety of keys that are common to remote control units for use with conventional television sets. These include power on/off 100, channel up 102, channel down 104, volume up 106, volume down 108, mute 110, and a 10 digit numeric keypad 112.

The preferred remote control unit also includes keys that are specifically related to preferred interactive system. A menu button 114 is used to open and close on-screen menus. A directional control 116 is a rocker switch that is used to select specific control items by moving a cursor up, down, left or right. An action button 118 is used to activate a selected control item. A help key 120 is used to initiate on-screen help. An "A" button 122 and "B" button 124 are used to select specific options that are provided in some contexts.

The Preferred Systems and Methods for Selecting Music Based on Subject Content Turning now to FIGS. 4–13, the preferred systems and methods for selecting music based on subjective content will be described. The primary features of the present invention are a "more like" music search function and a "style equalizer" (style EQ). In addition, the preferred audio on demand system also provides a variety of ancillary features. These features allow a subscriber to find a specific song by artist and title or select a playlist, which is a collection of songs. Once a playlist is selected, the user may review the contents of the playlist and select another song in the playlist. While a song is playing, the listener may add the song to a playlist called "my favorites", or mark the song so that it is never played again. Each of these features is discussed in conjunction with its corresponding user interface and control objects.

Figure 4:
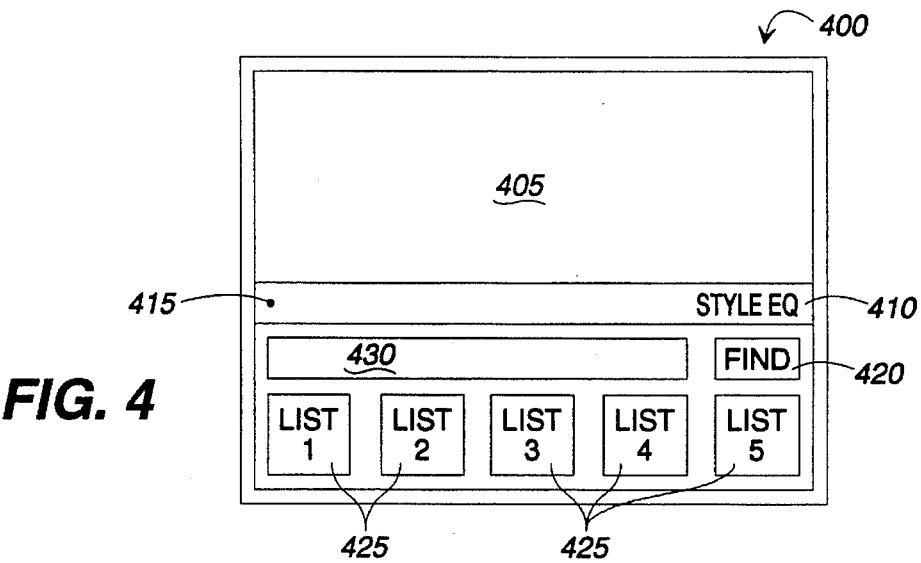
FIG. 4 is illustrates the features of the initial screen display in the preferred audio on demand system.
Figure 5:
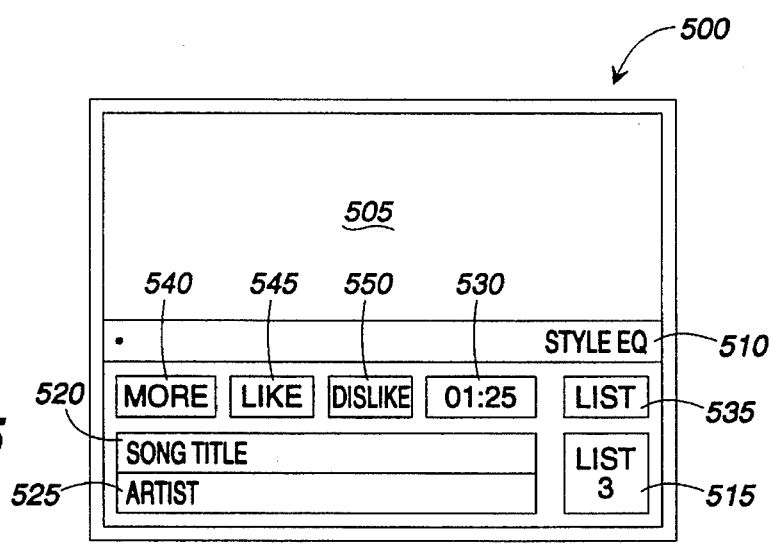
FIG. 5 illustrates the features of the playlist screen display in the preferred audio on demand system.
Figure 6:
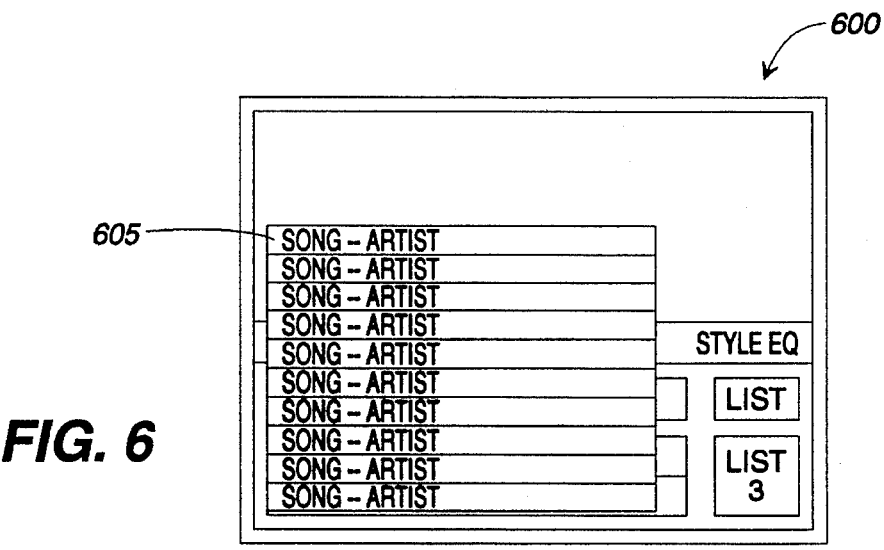
FIG. 6 illustrates a list of songs provided in response to the find button on the playlist screen display of FIG. 5.
Figure 11:
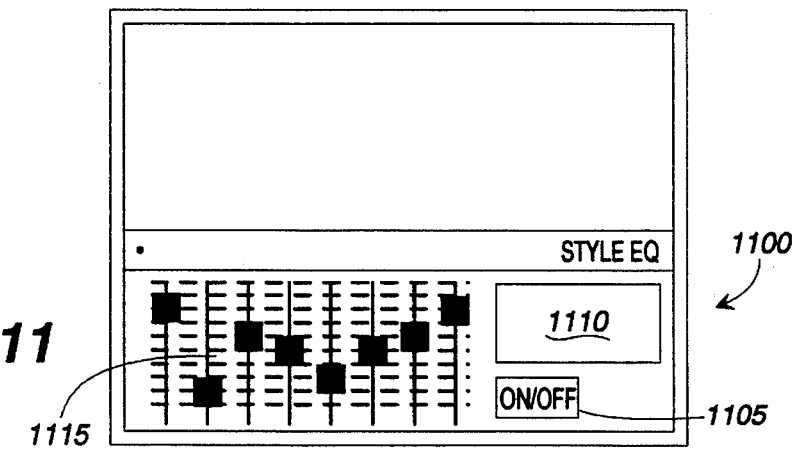
FIG. 11 illustrates the features of the "style equalizer" screen display.

FIGS. 4–6 illustrate general aspects of the user interface employed in the preferred embodiment of the present invention, which is referred to as the audio on demand system. FIGS. 7–10 include screen displays and flow charts associated with the "more like" function, which provides the subscriber with more songs that are like the current song. FIGS. 11–13 includes a screen display and flow charts associated with the style EQ function, which displays the styles associated with the current playlist and allows the subscriber to adjust the mix of songs played from the playlist.

The General User Interface

Before describing the preferred "more like" and "style EQ" functions in detail, it will be helpful to understand the basic features of the preferred audio on demand system and the user interface. This information is provided in conjunction with FIGS. 4–6, which illustrate screen displays that appear on the subscriber's display or monitor. Each of the screen displays that form a part of the user interface provide information and control objects, which typically appear as buttons. The subscriber may select and activate the control objects using the directional control and action button on the remote control unit (FIG. 3). An object is selected by moving the "focus" to the object. The focus is analogous to a cursor on a general purpose computer, and may be represented by a highlighted or colored frame or border that appears around a control object.

The audio on demand system relies on an audio content database, which includes all of the programming information items (e.g., songs) available on the system. The songs in the audio content database are obtained from various sources and are loaded on the continuous media servers that form a part of the headend system. In most cases, the operator of the system will arrange for record companies to provide their music catalogs. Those skilled in the art will appreciate that while the audio on demand system is capable of combining music catalogs from various sources into an integrated music resource, some music companies may prefer that their music not be mixed with music from other publishers. In this case, the system may make different music catalogs available on different channels on the interactive network.

FIGS. 4–6 illustrate the basic features of the audio on demand user interface. FIG. 4 illustrates the initial audio on demand screen display 400, which appears when the subscriber selects the audio on demand system. The initial screen display 400 is divided into three (3) different regions or panels. The top region is a graphic display field 405, which may be used to display graphic images associated with the audio on demand system. For example, the service provider may choose to display a service mark, trademark or other logo when an audio on demand channel is selected by the subscriber.

Immediately below the graphic display field 405 is the style EQ panel 410. The style EQ panel 410 is used to select the style equalizer, which is described below. The style EQ panel 410 also includes a style EQ status indicator 415, which indicates whether the style EQ feature is currently activated.

The bottom region of the screen display 400 is used to select individual songs or playlists. A find button 420 is provided in order to allow a subscriber to select a specific song. When the find button is activated, the screen displays bins that appear to be similar to those found in music stores. In these bins, artists are listed in alphabetical order. When the subscriber selects a particular artist, the names of the artist's albums appear in chronological order, and are followed by an alphabetical listing of the artist's songs. The subscriber may use this feature to select a particular song or album. If the user selects a song, that song is loaded into a new playlist. If the user selects an album, all of the songs from that album are loaded into a new playlist.

The screen display 400 also includes a plurality of playlist buttons 425, which allow the subscriber to select a playlist. As described briefly above, a playlist is a collection of songs. Playlists may be generated in a variety of different ways. For example, various types of playlists may be provided by the service provider or other publishers. In addition, a subscriber may build a playlist one song at a time using the find button 420. A subscriber may also communicate with the preferred interactive network via a personal computer. When connected in this manner, the subscriber may use the personal computer to create and name playlists, perform abstract music searches or queries, etc. Those skilled in the art will appreciate that the interface provided by a personal computer is much more efficient for these tasks than a cumbersome on-screen interface that relies on input from a remote control unit. Those skilled in the art will also appreciate that playlists need not be limited to songs. Playlists can include collections of news stories, movies, and other types of programming information. The five playlist buttons 425 are similar to the preset buttons on car radio and indicate the subscriber's five favorite playlists.

The bottom portion of the screen display 400 includes an alphanumeric display 430, which is used to provide some feedback when the subscriber selects one of the other control objects on the screen. For example, when the subscriber uses the remote control unit to move the focus to one of the playlist buttons, the alphanumeric display 430 indicates the name of the associated playlist. Likewise, when the find button has the focus, the alphanumeric display 430 displays an informative message such as "select a song".

FIGS. 5 and 6 illustrate the format of the screen displays 500 that are associated with individual playlists. The playlist screen display 500 appears after the subscriber has created a new playlist by using the find button 420 or selected an existing playlist using one of the playlist buttons 425 on the initial screen display 400 (FIG. 4). Like the initial screen display 400, the playlist screen display 500 includes a graphic display field 505 and a style EQ panel 510. The graphic display panel 505 may be used to display general information associated with the playlist or information associated with the currently playing album or song.

The bottom portion of the playlist screen display 500 includes a playlist identification box 515. If the playlist was selected by choosing one of the playlist buttons 425 on the initial screen display, the playlist identification box 515 will include the same name, logo or icon that appeared on the playlist button. In the preferred audio on demand system, if the playlist was selected by using the find button 420 on the initial screen display, the playlist identification box 515 will display an icon that resembles a compact disc. The compact disc icon is used to indicate a user preference playlist.

As mentioned above, a playlist is a collection of songs. When a playlist is selected, the audio on demand system begins to play the first song in the playlist. The name of the current song is displayed in a song title box 520. The artist's name is displayed in an artist box 525. A counter 530 displays the elapsed time of the current song.

The playlist screen display 500 also provides a list button 535, which may be used to display a list of the songs that are included in the current playlist and to jump to another song in the playlist. FIG. 6 shows a screen display 600 with a pop-up list 605, which is displayed when the subscriber activates the list button 535 on the playlist screen display 500. Each entry in the list includes the title of the song and the artist. In the preferred audio on demand system, the list displays ten (10) of the songs in the current playlist. The subscriber may use the directional control on the remote control unit to scroll through all of the songs in the playlist. The subscriber may also select any of the songs in the playlist by using the directional control to highlight the desired song and pressing the action button (on the remote control unit, FIG. 3). After the subscriber selects a song from the list 605, the system returns to the playlist screen display 500. At that point, the newly selected song begins to play, and the song's title and artist are displayed in the song title box 520 and artist box 525, respectively.

The playlist screen display of FIG. 5 also includes a "more" button 540, a "like" button 545, and a "dislike" button 550. The "more" button 540 is used to activate the "more like" music search function, which is described below. The subscriber may add the currently playing song to a playlist called "my favorites" by activating the "like" button 545 while a song is playing. If the user does not like the current song, the subscriber may activate the "dislike" button 550 while the song is playing. Once the subscriber indicates the song is disliked, the audio on demand system will never play that song again for the subscriber. This is true without regard to where the song is found. In the preferred audio on demand system, the only way for a subscriber to again listen to a song has been labeled as disliked is to select that specific song using the find button on the initial screen display (FIG. 4).

The "More Like" Function

Generally described, the "more like" function of the present invention provides systems and methods for using a seed song (e.g., the current song) to add new songs to a playlist. This is accomplished on the basis of subjective style classifications and style weightings that are associated with the songs in the audio content database.

The "more like" function allows for the context based selection of subjective material. More particularly, the "more like" function allows a subscriber to locate additional songs on the basis of subjective decisions that have been made regarding the styles of the songs. In order to work properly, the subscriber must be able to predict the output of the "more like" function to some extent. In other words, the "more like" functions must find songs that most subscribers would agree are "similar" to the seed song.

Those skilled in the art will appreciate that it is subjective content that complicates the classification of information. Systems that classify only objective content are easily implemented. For example, songs are easily classified and identified by their title and artist. However, systems that accurately and predictably classify and search subjective content are more complex. In this sense, the present invention is applicable to any systems that classify and select programming information having subjective content. However, in the preferred system, the invention is described in the context of musical selections.

In the present invention, the subjective content associated with each song is embodied in style tables, which are tools for classifying each song's subjective content. Each song can be associated with any number of different styles. The editor that creates the style table must determine how important each style is to the description of each song. This is reflected by weighting each style as it pertains to each song. Thus, the process of creating a style table for an artist involves two steps: (1) creating the list of possible style categories; and (2) assigning weightings to each style category. Both of these steps are performed by the editor that creates the style table.

The "more like" function relies on two elements: a database and a method for searching and combining the songs in the audio content database. As mentioned above, the database takes the form of style tables that classify the style of each song. Although human beings work well as editors to provide the required editorial content, there are limits as to the number of categories that can be considered. For example, the operator of the audio on demand system may deem it acceptable to spend the time to classify the artists of the songs that are provided on the system. However, the system operator may not consider it feasible to classify each and every song on the system.

In the present system, these considerations are accommodated by allowing music to be classified by various levels (e.g., artist, album, song). The editor is responsible for choosing the particular level or levels that will be used in the system. This decision depends on the amount of editorial time the editor is willing to spend and the specificity required for the desired outcome of the "more like" function. Although they require more editorial work, higher level style tables (e.g., album or song) allow the style tables to more accurately reflect the styles associated with each song or album. This is especially useful in the case of artists whose styles have varied over their career or from album to album.

In the preferred audio on demand system, the style tables are constructed at the artist level, which is the lowest level, or broadest area of categorization. This reduces the amount of editorial work required, while providing style information that can be broadly applied to all of the songs available on the system.

In the preferred system, the each song has a song identification (ID) number that uniquely identifies that song. Similarly, each artist is identified by a unique artist ID number. The digital audio data is stored on a continuous media server by song ID number. The associated administrative information is stored on an administrative server. The administrative information includes the style tables, information for each song (title, artist, album, etc.), and all of the other databases, graphics, text, etc. that are required by the audio on demand system. A playlist is created by creating a database that includes the song ID numbers of the songs that are included in the playlist.

In the preferred embodiment of the present invention, the style tables operate in the following manner. The audio on demand system operator creates an artist level default style table for all of the artists whose songs appear on the system. As mentioned above, the editor must determine which style categories to use and the weightings assigned to each artist. Therefore, the default style tables may include any number of style categories associated with any number of artists.

An example of a style table for the Beatles is shown below:

| Artist: The Beatles | |
| --- | --- |
| Style Category | Weight |
| 1960s | 1 |
| 1970s | 1 |
| British Invasion | 7 |
| Rock | 5 |
| Pop | 5 |
| Innovators | 6 |

Although the audio on demand system provides default style tables for all of the artists whose songs appear on the system, playlist publishers may wish to provide their own style tables that categorize artists in a different manner. For example, the default style tables may include a single category for rap music. However, rap music aficionados may prefer to further classify rap music into more precise subcategories, such as New York City rap, Los Angeles Rap, Male Rap, Female Rap, etc.

The present invention allows playlist-specific style tables to be loaded into the system with each playlist. Therefore, playlist publishers may elect to use the default style tables, or may provide their own. Each playlist-specific style table may reclassify all of the artists whose music appears on the system, or only artists of particular interest. Thus, in the previous rap music example, a publisher of a rap music playlist may provide a style table that reclassifies those artists whose music appears in the rap playlist. In other words, a playlist publisher can recategorize the artists that are important to that publisher, and for which they want to make finer distinctions.

The method of searching for and matching the entries in the audio content database employs a qualitative scale of closeness, which is controlled by a matching closeness indicator. In the preferred system, the matching closeness indicator is a style slider, which is presented as part of the user interface. The qualitative scale of closeness determines the degree of similarity between the subjective content of the seed song and the songs that will be chosen by the "more like" function. Thus, the style slider allows the subscriber to determine the closeness of the match.

The advantage of the qualitative scale of closeness is that it purposely allows the subscriber to choose a very broad setting. Those skilled in the art will appreciate that many subscribers will want to expand their playlists to include new songs that are only somewhat similar to earlier entries. This provides a mechanism by which a subscriber may move his or her playlist in new directions instead of repeatedly narrowing the playlist. Likewise, this method of finding similar music is vastly superior to searching by artist name or song title.

The outcome of the "more like" function depends on the relationship between the number of styles in the style tables, the weighting scale, and the position of the style slider when the "more like" function is activated.

Figure 7:
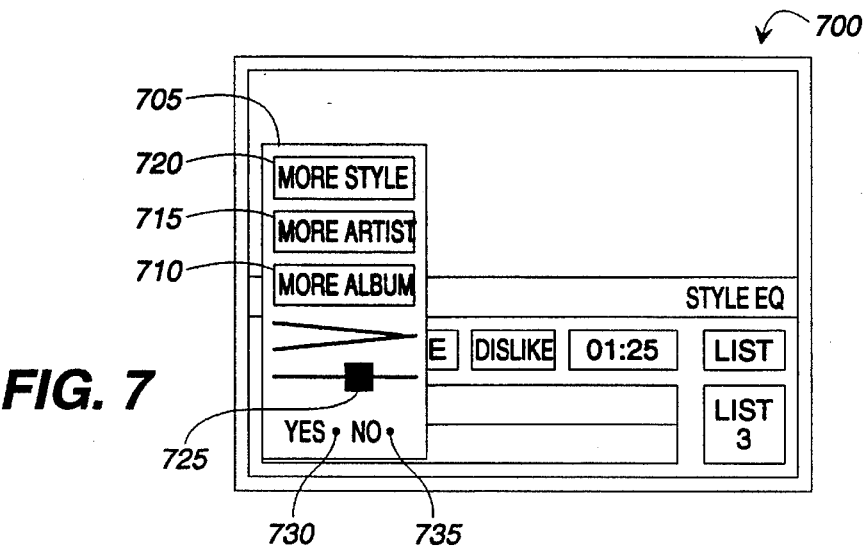
FIG. 7 illustrates the "more like" panel provided in response to the "more" button on the playlist screen display of FIG. 5.
Figure 8:
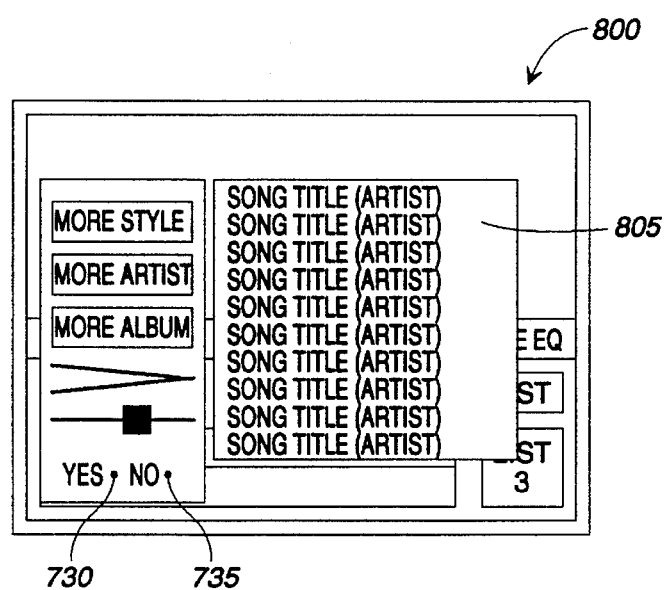
FIG. 8 illustrates a list of songs provided by the "more like" function.

FIGS. 7 and 8 illustrate the screen displays associated with the "more like" music search function FIG. 7 illustrates the more like screen display 700. A more like panel 705 appears when the subscriber activates the more button 540 on the playlist screen display 500 (FIG. 5). The more like panel 705 includes several control objects. A more album button 710 instructs the audio on demand system to list the other songs from the album that includes the current song. A more artist button 715 instructs the system to list more songs by the artist that performed the current song. A yes button 730 and a no button 735 allow the subscriber to accept or reject the list of songs that are presented as the output of the "more album" and "more artist" functions. If the subscriber selects the yes button, the listed songs are added to the current playlist.

A more style button 720 allows the subscriber to locate more music that is like the current song. The more style button 720 operates in conjunction with a style slider 725, which the subscriber sets to indicate the degree of closeness or similarity that is required in order for a song to match the current song. If the subscriber moves the style slider 725 all the way to the right, the "more like" function will produce songs with styles that are very similar to the current song. As the style slider 725 is moved to the left, the "more like" function with present the subscriber with a broader group of songs that are in some way similar to the current song. A yes button 730 and a no button 735 allow the subscriber to accept or reject the list of similar songs that are presented as the output of the "more like" function.

FIG. 8 is a screen display 800 that includes a list 805 of songs that are generated in response to the more style button. In the preferred system, ten similar songs are presented to the subscriber. If the subscriber likes the songs in the list, he or she can add the songs to current playlist by activating the yes button 730. If the subscriber wants to see other songs based on the same matching criteria, he or she may activate the more style button while leaving the style slider in the same position. If the subscriber wants to see songs that are more or less similar than those in the current list, the subscriber may adjust the style slider and activate the more style button. Finally, if the subscriber decides not to add any songs to the current playlist, the subscriber may activate the no button 735. Once the subscriber activates the yes or no button, the list 805 and more like panel disappear, and the system displays the playlist screen display 500 (FIG. 5). The details of the "more like" engine are provided below.

Figure 9:
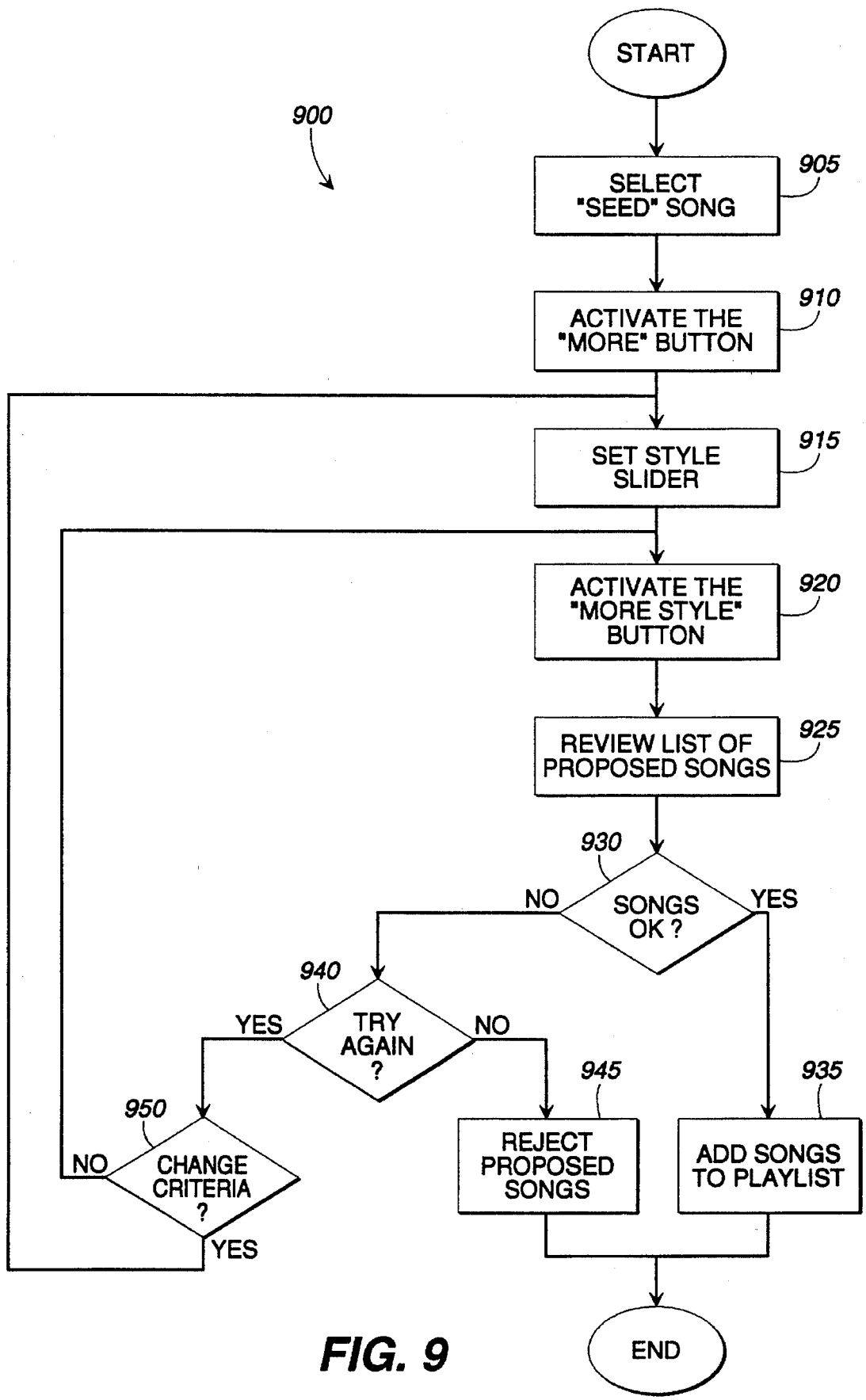
FIG. 9 is a flow diagram illustrating the steps taken by a subscriber when using the "more like" function.

FIG. 9 is a flow diagram that summarizes the steps carried out by a subscriber who is using the more button 540 to find more music. The method 900 begins at step 905 when the user selects a song to hear. This is accomplished by using the find button to select a specific song, or by selecting a playlist. Those skilled in the art will appreciate that the "more like" function uses the current song as a "seed song" and selects other songs that match the style criteria associated with the seed song.

At step 910 the subscriber activates the more button 540 on the playlist screen display 500 (FIG. 5). This causes the more like panel to appear. At step 915 the subscriber sets the style slider in order to determine the closeness of the match. When the style slider is moved to the right, the "more like" function finds songs whose style more strongly resembles the seed song. As the style slider is moved to the left, the "more like" function relaxes the degree of similarity that is required. The function of the style slider is described more completely below.

At step 920 the user activates the more style button 720 on the more like panel 705 (FIG. 7). When the subscriber activates the more style button, the audio on demand system carries out the process of identifying songs that have a style similar to the seed song. This process is described in detail below in connection with FIG. 10. When the process is complete, the system displays a list of ten (10) songs for review by the subscriber. This list is reviewed by the subscriber at step 925.

At step 930 the subscriber determines whether the songs included in the list should be added to the current playlist. If so, the subscriber activates the yes button on the more like panel, and the system adds the songs to the playlist (step 935). If the subscriber decides not to add the songs to the playlist, the subscriber must decide whether to quit the more like function (step 940). If so, the subscriber activates the no button and the more like panel is dismissed (step 945).

At step 940 the subscriber may decide to try the more like function again and see a different list of songs. If this is the case, the subscriber determines whether to leave the style slider in the same place (step 950). If so, the subscriber returns to step 920 and activates the more style button. This causes the system to display ten other songs from the group of songs that was generated earlier. If the subscriber decides to expand or narrow the matching criteria, the subscriber returns to step 915 and adjusts the style slider prior to activating the more style button.

Figure 10:
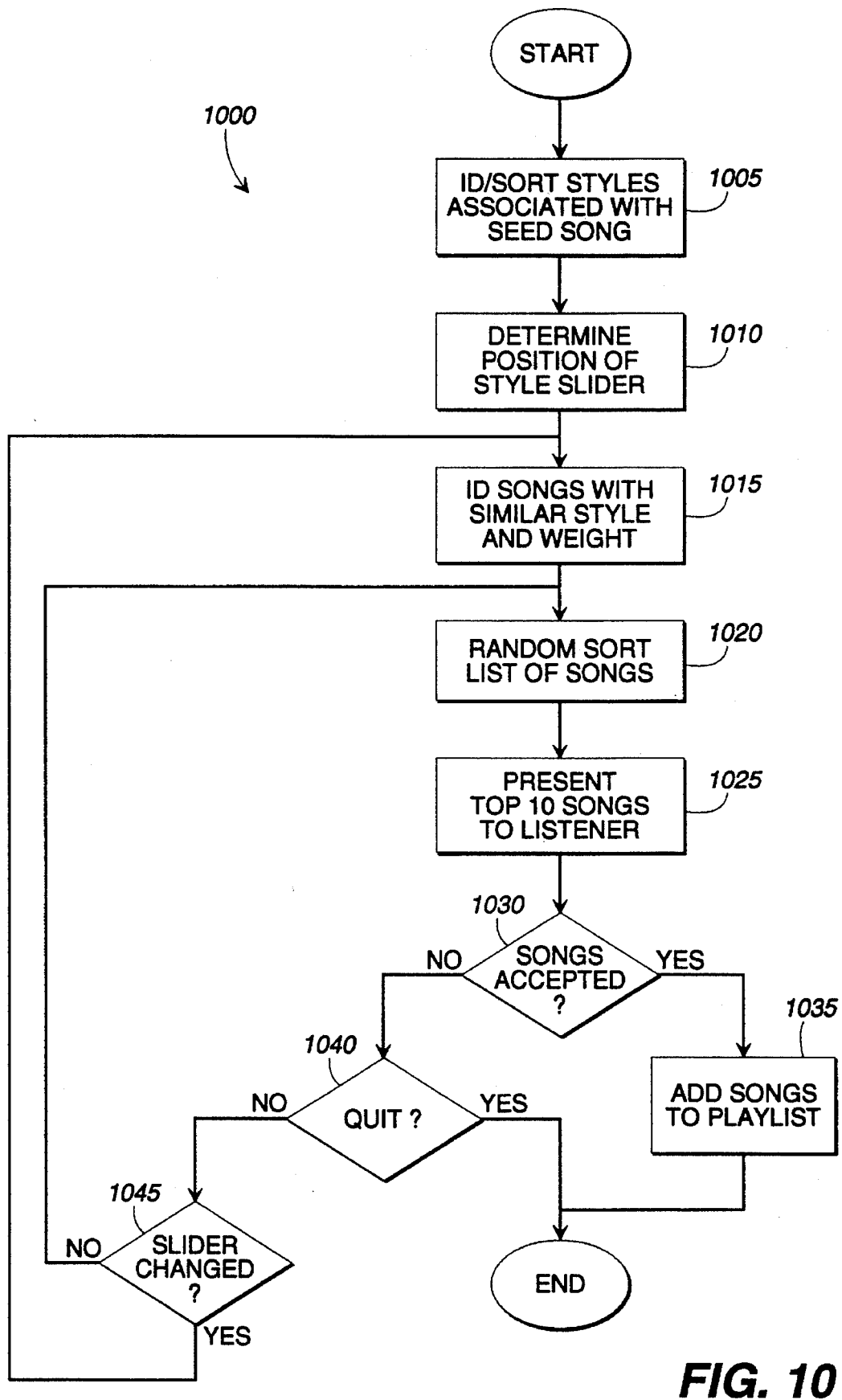
FIG. 10 is a flow diagram illustrating the "more like" function as implemented in a program module running on the preferred interactive network.

FIG. 10 is a flow diagram illustrating the "more like" function of the present invention as implemented in a program module running on a headend server, which forms a part of the interactive network. The method 1000 begins at step 1005 after the user has selected a seed song and activated the more style button. At step 1005 the system uses the style tables to identify the style categories and weightings that are associated with the seed song. In the preferred embodiment, which implements only artist level style tables, this step involves identifying the style table that corresponds to the artist that performed the seed song. The style table data is then sorted by weighting in decreasing order.

At step 1010 the system determines the setting of the style slider. The style slider operates to indicate a percentage, which is applied to the sorted style table in the manner described below. The percentage associated with a particular style slider position depends on the granularity of the style slider. If the style slider has 11 positions, the positions would represent increments of 10% each (ranging from 0% to 100%). Thus, the rightmost position would indicate a 100% match was desired. If the style slider is in the center position, that would indicate a 50% was desired.

At step 1015 the system uses the seed song's style table and the position of the style slider to identify more songs that are like the seed song. In the preferred system, this step involves identifying other artists who have the same styles as the seed song artist at weights that are at least as high as the position of the style slider.

The following example will illustrate the operation of this step, and the relationship between the styles in the style table, the weighting scale, and the position of the style slider. Assume the style table weighting scale ranges from 1–10 and the style slider has 11 positions (at >0%, 10%, 20%, . . . , 80%, 90%, 100%). If the style slider is set at 100%, the system will determine which of the style categories associated with the seed song artist have weightings of 10 (which is 100% of the 1–10 scale). After these style categories are identified, the system will search for artists who have at least one of the same style categories at a weighting of 10. Those skilled in the art will appreciate that this process will yield artists whose style is very similar to the seed song artist.

If the style slider is set at 50%, the system will determine which of the style categories associated with the seed song artist have weightings of at least 5 (which is 50% of the 1–10 scale). After these style categories are identified, the system will search for artists who have at least one of the same style categories with a weighting of at least 5.

If the seed song is a Beatles song and the system uses the sample style table provided above, a style slider position of 50% would match artists who have the styles British Invasion, Innovators, Rock or Pop with a weighting of at least 5. Those skilled in the art will understand that the "more like" function is constrained by the style categories that are associated with the seed song artist. However, the matching weightings for those style categories are determined by the position of the style slider.

At this point, it should be appreciated that the style slider positions, which are determined by the system provider, work with any style table, regardless of the weighting scale used. For example, if a style table uses a weighting scale of 1–100, a style slider position of 60% will search for artists having the requisite styles with a weighting of at least 60. This allows playlist publishers and others to create compatible style tables using any size weighting scale.

After the matching artists are identified, the system compiles a list of the songs performed by those artists. In order to limit the number of songs that may be included in the group, the system can be designed to select only a predetermined number of songs by each artist.

At step 1020 the system performs a random sort of the songs that were identified in step 1015. At step 1025 the system picks the first ten songs from the sorted group of songs and displays a list of those 10 songs to the subscriber. This is illustrated in FIG. 8. In the preferred system, the style categories and weightings that are used in the search are not displayed to the subscriber.

At step 1030 the system determines whether the subscriber has accepted the songs by activating the yes button on the more like panel. If so, the method proceeds to step 1035, the 10 songs in the list are added to the current playlist, and the method 1000 ends. Instead of adding all 10 songs to the playlist, an alternative user interface may be provided in order to allow the subscriber to specify which of the 10 listed songs should be added to the playlist.

If the subscriber does not activate the yes button, the method proceeds to step 1040 and determines if the subscriber has activated the no button on the more like panel. If so, the method 1000 ends.

At step 1040 the system may determine that the subscriber has again activated the more style button. If this occurs, the system proceeds to step 1045 and determines the position of the style slider. If the position of the style slider is the same as before, the system returns to step 1020 and resorts the same group of songs. If the subscriber moved the style slider before reactivating the more style button, the system returns to step 1015 and identifies other songs that match the new criteria.

Although the preferred system only implements artist level style tables, the system could also implement album level style tables and song level style tables. Those skilled in the art will appreciate that using "low level" style tables (i.e., artist level) reduces the amount of editorial work required to classify the music available in the system. While requiring more editorial work, higher level style tables (e.g., album or song) allow the style tables to more accurately reflect the styles associated with songs or albums. This is advantageous because it can be used to take into account artists whose styles have varied over their career or from album to album.

If more than one level of style tables is provided, the system may be designed to implement an "aggregation function" in the process of step 1015. Aggregation allows the system to combine one or more levels using any type of mathematical operator. For example, "adding" style levels leads to a tighter match between songs. "Multiplying" style levels results in a broader spread of songs that will match the seed song.

Although the "more like" function has been described as searching the entire audio content database, it is possible to limit the search material that is searched by the system. For example, instead of searching all published songs, the "more like" process may be used to search only new releases. This would allow a subscriber to use the "more like" function to add new music to a playlist. Those skilled in the art will understand that the source material in the audio content database may be selected or restricted in any number of ways, and that the data used to make such distinctions is maintained on the interactive network's administrative servers.

From the foregoing description of the "more like" function, those skilled in the art will appreciate that the present invention includes two means for providing context during the search. First, the style slider allows the subscriber to control the closeness of the matches provided by the "more like" function. Second, the present invention employs editorial data produced by the system operator and playlist publishers to classify the songs in the audio content database. Because new style tables may be loaded in with a playlist, the outcome of the "more like" function will vary depending on the nature of the style table and the editorial decisions made by the playlist publisher.

Finally, those skilled in the art will appreciate that the present invention provides distinct advantages over various other computer based processes that could be used to identify similar songs. For example, it is possible to implement a "more like" engine based on the computer analysis of rhythm, tempo, etc. However, such an approach would require relatively powerful computer processors, and would require that all of the songs in the audio content database be pre-analyzed. Furthermore, such a system may not be predictable, because most listeners would not equate jazz at 120 beats per minute with classical at 120 beats per minute.

The Style EQ Function

As described briefly above, the style EQ function addresses two distinct needs that arise in the interactive network environment. These problems arise because a subscriber typically selects a playlist on the basis of a very short title, and because playlists may include a relatively large number of songs. First, the style EQ allows the subscriber to get a clearer look at what types of music are included in the playlist. The system accomplishes this by displaying an indicator for each of the predominant styles in the playlist and setting the position of the indicators to reflect the relative portion of the playlist that includes that style. This allows the subscriber to see how much music of each style is present in the playlist. Second, the style EQ feature allows the subscriber to alter the mix of the songs that are played from the playlist by adjusting one or more of the indicators. Thus, if the subscriber does not care for one of the styles in the playlist, the subscriber can decrease the amount of that style that is played. Similarly, the subscriber can boost the styles of music that he or she enjoys, which acts as a filter and does not alter the actual content of the playlist. This allows a subscriber to listen to a playlist in a variety of different ways.

FIG. 11 illustrates the screen display associated with the style EQ function provided by the preferred audio on demand system. The style EQ screen display 1100 is displayed when the subscriber selects the style EQ function from the style EQ panel on the initial screen display 400 (FIG. 4) or the playlist screen display 500 (FIG. 5). The style EQ screen display 1100 covers the bottom portion of the display. The style EQ screen display includes an on/off button 1105, an alphanumeric display 1110, and a plurality of faders 1115. The style EQ is turned on and off by activating the on/off button 1105. The alphanumeric display 1110 provides information to the subscriber.

The preferred style EQ includes eight (8) indicators, or faders 1115. Those skilled in the art will appreciate that the style EQ faders resemble a conventional graphic equalizer. However, instead of each fader being assigned to a frequency band, each fader is assigned to a particular style of music included in the playlist. This allows the faders to be used to give a subscriber a clearer picture of the types of music included in a playlist. For example, a playlist that includes rock music may simply be called "Rock". The style EQ faders may indicate that the playlist includes music that may be more specifically described as 1970s rock, 1980s rock, 1990s rock, soft rock, acid rock, heavy metal, etc.

When a playlist is loaded and the style EQ function is first turned on, the faders 1115 are positioned by the system to indicate the portion of the playlist that fits into the associated style category. The subscriber may get an idea of what is included in the playlist by using the remote control unit's directional control to highlight each of the faders. The display 1110 displays the name of the style associated with the highlighted fader.

The style EQ function also allows the subscriber to adjust the mix of songs that is played from the playlist. For example, if the subscriber dislikes acid rock and heavy metal, the subscriber can "attenuate" those styles by using the remote control unit to move those faders to their lowest position. Likewise, the subscriber can "boost" the amount of soft rock songs that are played by moving the fader upward. Those skilled in the art will appreciate that the style EQ function does not alter the content of the playlist. Instead, it merely adjusts the mix of songs that are played from the playlist. The details regarding the operation of the style EQ function and the assignment of style names to the faders are discussed below.

FIG. 12 is a flow diagram that summarizes the steps carried out by a subscriber who is using the style EQ function. The method 1200 begins at step 1205 when the user selects a playlist. This is accomplished by using the playlist buttons on the initial screen display. After a playlist is selected the subscriber activates the style EQ screen display 900 (FIG. 9) by activating the style EQ button on the playlist screen display (step 1210). This causes the system to display the style EQ panel with the faders set to indicate the mix of songs included in the playlist.

At step 1215 the subscriber reviews the style labels associated with each fader and the proportion of songs that are described by that style. At step 1220 the, subscriber determines whether to adjust the sliders in order to alter the mix of music that is played from the playlist. If so, the subscriber uses the direction control on the remote control unit to adjust one or more faders up or down (step 1225). The subscriber then proceeds to step 1230 and dismisses the style EQ panel. If at step 1220, the subscriber decides not to adjust the faders, the subscriber proceeds to step 1230 and dismisses the style EQ panel.

FIG. 13 is a flow diagram illustrating the style EQ function of the present invention as implemented in a program module running on a headend server, which forms a part of the interactive network. The method 1300 begins at step 1305 by playing a playlist that has been selected by the subscriber.

At step 1310 the system identifies the predominant styles of music that are included in the playlist. Those skilled in the art will appreciate that this step may be accomplished in a variety of ways. In the preferred system, the style information used by the style EQ function is provided by the publisher of the playlist, and is loaded into the system when the playlist is selected. In this case, the playlist style data defines the style categories that will be associated with each of the faders and provides the initial settings for the faders.

In an alternative embodiment, the system may assign style categories to faders by reading the style tables (provided in conjunction with the "more like" function) and assigning the predominant style categories to the faders. The style tables would provide the information necessary to determine how many songs are associated with each style, and the relative portions of the playlist that are described by each of these styles.

Once the predominant styles have been identified, the system proceeds to step 1315 and assigns the styles to the faders. As described above, the style EQ function in the preferred system includes 8 faders. Those skilled in the art will appreciate that there are no inherent limitations on the number of faders (and associated styles) that can be used in conjunction with the style EQ function.

Those skilled in the art will appreciate that either method allows the fader labels to be determined by the music in each playlist. This avoids the problems that would arise if the system defined only a fixed number of style labels that could be assigned regardless of the types of music in a playlist. The present invention allows broad labels to be used for playlist containing a broad mix of styles and specific labels to be used for narrower playlists. For example, if a playlist included all of the music in the world, the fader labels would be broad categories, such as classical, jazz, country, rock, etc. Similarly, if a playlist includes only jazz music, the style EQ function will assign meaningful jazz related subcategories to the faders.

Defining the labels on the basis of the content of each playlist also ensures that each fader label represents music that is in fact included in the playlist. This avoids the problems of having a fader label without having any music to go with it. For example, it would be misleading is there is a standard label for jazz music, but a playlist does not include jazz music. This would lead to the subscriber thinking he can increase the amount of jazz music played from the playlist, when in fact the playlist includes no jazz music.

At step 1320 the system adjusts the position of the faders to reflect the relative portion of songs that are described by the style associated with each fader. This allows the subscriber to see about what portion of the playlist is represented by each style of music.

At step 1325 the system determines whether the subscriber has moved any of the fader from their original positions. If not, the method proceeds to step 1330 and plays all of the songs in the playlist in order.

If at step 1325 one or more of the faders have been moved, the system goes to step 1335 and adjusts the mix of the music that is played from the playlist. Those skilled in the art will appreciate that the style EQ feature does not alter the playlist by adding or removing songs. Instead it simply adjusts the mix of songs that are played from the playlist.

In the preferred system, the percentage of the songs that have each style is determined by the following equation:

$$\% \text{ of style} = (\text{value of style})/(\text{total values for all styles})$$

In this equation, the value of each style is determined by the position of the fader and the number of positions on each fader. For example, on the style EQ panel of FIG. 10, each fader has 10 positions. If we refer to each of the faders as styles 1–8 (from left to right), the total values for all styles is 51 (which is the sum of 9 +3+7+6+4+6+7+9) out of a possible 80. In this example, the percentage of music with style 1 is $9/51 = 18\%$. Similarly, the percentage of music with style 2 is $3/51 = 6\%$.

Those skilled in the art will appreciate that an advantage of the style EQ feature is that moving a fader up or down leads to results that the user can understand. Furthermore, although the style EQ function has been described in the context of music playlist, those skilled in the art will appreciate that this aspect of the invention may be applied to many collections of material with subjective content. For example, the style EQ could be applied to a playlist that includes news stories, with faders labels such as national news, international news, business, sports, etc. This would allow subscribers to adjust the faders so that they hear more of the stories they are interested in, and less of the stories they are not interested in.

From the foregoing description, it will be appreciated that the present invention provides efficient systems and method for selecting and playing music based on its subjective content.

The foregoing methods of the present invention may conveniently be implemented in a program module that is based upon the flow charts in FIGS. 10 and 13. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described in the context of an interactive network system, those skilled in the art will understand that the principles of the present invention may be applied to, and embodied in, any type of interactive computing device, including general purpose computers, personal computer, notebook computers, etc.

Furthermore, the program modules described in conjunction with the preferred embodiment run on the headend server, which forms a part of the interactive system. Those skilled in the art will appreciate that the system may be configured so that various program modules run on the set top terminal. For example, data associated with the current playlist and its style EQ settings could be downloaded to the set top terminal in order to increase the processing speed.

Alternative embodiments will become apparent to those skilled in the art to which the present invention pertains without departing from its spirit and scope. Accordingly, the scope of the present invention is defined by the appended claims rather than the foregoing description.

What is claimed is:

1. In an interactive media distribution system including a media server, a distribution network, an output device and an input device, a method for selecting programming information items from said media server comprising the steps of:

storing on said server a plurality of programming information items and editorial data associated with said programming information items;

playing, in response to a first input signal from said input device, an initial programming information item from said plurality of programming information items;

creating, in response to a second input signal from said input device, a list of proposed new programming information items on the basis of said editorial data associated with said initial programming information item and said plurality of programming information items;

presenting on said output device said list of said proposed new programming information items; and adding, in response to a third input signal from said input device, said proposed new programming information items to a playlist.

2. In an interactive media distribution system including a media server, a distribution network, an output device and an input device, a method for selecting programming information items as recited in claim 1, wherein said editorial data comprises subjective content and weighting information associated with each of said programming information items, and wherein creating a list of proposed new programming information items comprises the steps of:

retrieving said editorial data associated with said initial programming information item;

identifying other programming information items having similar editorial data; and selecting a predetermined number of said other programming information items having similar editorial data.

3. In an interactive media distribution system including a media server, a distribution network, an output device and an input device, a method for selecting programming information items as recited in claim 1, wherein said editorial data comprises subjective content and weighting information associated with the author of each of said programming information items, and wherein creating a list of proposed new programming information items comprises the steps of:

identifying the author of said initial programming information item;

retrieving the editorial data associated with said author;

identifying other authors having similar editorial data; and selecting a predetermined number of programming information items by authors having similar editorial data.

4. In an interactive media distribution system including a media server, a distribution network, an output device and an input device, a method for selecting programming information items as recited in claim 1, wherein creating a list of proposed new programming information items comprises the steps of:

determining the setting of a matching closeness indicator; and selecting new programming information items by comparing said editorial data associated with said initial programming information item with said editorial data associated with said plurality of programming information items, said comparison being based on the setting of said matching closeness indicator.

5. In an interactive media distribution system including a media server, a distribution network, an output device and an input device, a method for selecting programming information items as recited in claim 1, wherein said interactive media distribution system comprises an interactive television system.

6. In an interactive media distribution system including a media server, a distribution network, an output device and an input device, a method for selecting programming information items as recited in claim 1, wherein said server is a continuous media server.

7. In an interactive media distribution system including a media server, a distribution network, an output device and an input device, a method for selecting programming information items as recited in claim 1, wherein said output device is a television monitor and said input device is a remote control unit.

8. In an interactive media distribution system including a media server, a distribution network, an output device and an input device, a method for selecting programming information items as recited in claim 1, wherein said programming information items comprise musical selections.

9. In an interactive media distribution system including a media server, a distribution network, an output device and an input device, a method for selecting programming information items as recited in claim 1, wherein said programming information items comprise movies.

10. In an interactive media distribution system including a media server, a distribution network, an output device and an input device, a method for selecting programming information items as recited in claim 1, wherein said programming information items comprise news stories.

11. In an interactive music distribution system including a server, a distribution network, an output device and an input device, a method for selecting musical selections from said server comprising the steps of:

storing on said server a plurality of musical selections and editorial data associated with said musical selections;

playing, in response to a first input signal from said input device, an initial musical selection from said plurality of musical selections;

creating, in response to a second input signal from said input device, a list of proposed new musical selections on the basis of said editorial data associated with said initial musical selection and said plurality of musical selections;

presenting on said output device said list of said proposed new musical selections; and adding, in response to a third input signal from said input device, said proposed new musical selections to a playlist.

12. In an interactive music distribution system including a server, a distribution network, an output device and an input device, a method for selecting musical selections as recited in claim 11, wherein said editorial data comprises subjective style and weighting information associated with each of said musical selections, and wherein creating a list of proposed new musical selections comprises the steps of:

retrieving said editorial data associated with said initial musical selection;

identifying other musical selections having similar editorial data; and selecting a predetermined number of said other musical selections having similar editorial data.

13. In an interactive music distribution system including a server, a distribution network, an output device and an input device, a method for selecting musical selections as recited in claim 11, wherein said editorial data comprises subjective style and weighting information associated with an album on which each of said musical selections was released, and wherein creating a list of proposed new musical selections comprises the steps of:

identifying the album on which said initial musical selection was released:

retrieving said editorial data associated with said album;

identifying other albums having similar editorial data; and selecting a predetermined number of musical selections from said other albums having similar editorial data.

14. In an interactive music distribution system including a server, a distribution network, an output device and an input device, a method for selecting musical selections as recited in claim 11, wherein said editorial data comprises subjective style and weighting information associated with the artist who performed each of said musical selections, and wherein creating a list of proposed new musical selections comprises the steps of:

identifying the artist who performed said initial musical selections;

retrieving the editorial data associated with said artist;

identifying other artists having similar editorial data; and selecting a predetermined number of musical selections performed by artists having similar editorial data.

15. In an interactive music distribution system including a server, a distribution network, an output device and an input device, a method for selecting musical selections as recited in claim 11, wherein creating a list of proposed new musical selections comprises the steps of:

determining the setting of a matching closeness indicator; and selecting new musical selections by comparing said editorial data associated with said initial musical selection with said editorial data associated with said plurality of musical selections, said comparison being based on the setting of said matching closeness indicator.

16. In an interactive music distribution system including a server, a distribution network, an output device and an input device, a method for selecting musical selections as recited in claim 11, wherein said interactive music distribution system comprises an interactive television system.

17. In an interactive music distribution system including a server, a distribution network, an output device and an input device, a method for selecting musical selections as recited in claim 11, wherein said server is a continuous media server.

18. In an interactive music distribution system including a server, a distribution network, an output device and an input device, a method for selecting musical selections as recited in claim 11, wherein said output device is a television monitor and said input device is a remote control unit.

19. A method for classifying and selecting programming information items having subjective content, comprising the steps of:

storing a plurality of programming information items;

storing editorial data associated with said programming information items, said editorial data including a plurality of categories and weightings associating each programming information item with said categories;

identifying, in response to a first input signal from an input device, an initial programming information item from said plurality of programming information items;

determining, in response to a second input signal from said input device, the setting of a matching closeness indicator;

determining matching categories for said initial programming entry, said matching categories including the categories whose weightings correspond to the position of the matching closeness indicator;

identifying matching programming information items, said matching programming information items including said matching categories with weightings corresponding to the setting of said matching closeness indicator; and presenting said matching programming information items of a user.

20. A method for classifying and selecting programming information items having subjective content as recited in claim 19, wherein said matching closeness indicator is set in response to a third input signal from said input device.

21. A method for classifying and selecting programming information items having subjective content as recited in claim 19, wherein said programming information items comprise songs.

22. A method for classifying and selecting programming information items having subjective content as recited in claim 19, wherein said programming information items comprise news stories.

23. A method for classifying and selecting programming information items having subjective content as recited in claim 19, wherein said programming information items comprise movies.

24. A system for classifying and selecting programming information having subjective content, comprising:

a data storage device containing a plurality of programming information items and editorial data associated with said programming information items;

an output device for providing information to a user;

an input device for receiving input from said user; and a computer associated with said data storage device, said computer being configured to:

play, in response to a first input signal from said input device, an initial programming information item from said plurality of programming information items, create, in response to a second input signal from said input device, a list of proposed new programming information items on the basis of said editorial data associated with said programming information items, present on said output device said list of proposed new programming information items, and add, in response to a third input signal from said input device, said proposed new programming information items to a playlist.

25. A system for classifying and selecting programming information as recited in claim 24, wherein said editorial data includes a plurality of style categories and weightings associated with each of said style categories.

26. A system for classifying and selecting programming information as recited in claim 25, wherein said proposed new programming information items and said initial programming selection include at least one identical style category.

27. A system for classifying and selecting programming information as recited in claim 24, wherein said programming information items comprise songs.

28. A system for classifying and selecting programming information as recited in claim 24, wherein said programming information items comprise new stories.

29. A system for classifying and selecting programming information as recited in claim 24, wherein said programming information items comprise movies.

30. In an interactive system including a server, an output device, and an input device, a method for indicating the mix of programming information included in a playlist and adjusting the mix of programming information played from said playlist, comprising the steps of:

loading a playlist including a plurality of programming information items;

loading editorial data associated with said plurality of programming information items;

displaying on said output device a predetermined number of indicators;

associating with each of said indicators a category from said editorial data, said indicators being positioned to indicate the portion of said plurality of programming information items corresponding to each of said categories;

adjusting, in response to an input signal from said input device, the position of at least one of said indicators;

selecting programming information items from said playlist such that the portions of said selected programming information items associated with each of said categories corresponds to the adjusted positions of said indicators; and playing said selected programming information items on said output device.

31. In an interactive system including a server, an output device, and an input device, a method for indicating the mix of programming information included in a playlist and adjusting the mix of programming information played from said playlist as recited in claim 30, wherein associating a category with each of said indicators comprises the steps of:

determining the predominant categories of said categories; and assigning said predominant categories to said indicators.

32. In an interactive system including a server, an output device, and an input device, a method for indicating the mix of programming information included in a playlist and adjusting the mix of programming information played from said playlist as recited in claim 31, wherein determining the predominant categories comprises the steps of:

identifying the categories included in said editorial data; and determining the number of programming information items associated with each of said categories.

33. In an interactive system including a server, an output device, and an input device, a method for indicating the mix of programming information included in a playlist and adjusting the mix of programming information played from said playlist as recited in claim 30, wherein selecting songs comprises the steps of:

determining a total number of positions associated with said indicators;

determining a number of positions associated with one of said indicators; and dividing said number of positions by said total number of positions.

34. In an interactive system including a server, an output device, and an input device, a method for indicating the mix of programming information included in a playlist and adjusting the mix of programming information played from said playlist as recited in claim 30, where;in said programming information items comprise songs.

35. In an interactive system including a server, an output device, and an input device, a method for indicating the mix of programming information included in a playlist and adjusting the mix of programming information played from said playlist as recited in claim 30, wherein said programming information items comprise news stories.

36. In an interactive system including a server, an output device, and an input device, a method for indicating the mix of programming information included in a playlist and adjusting the mix of programming information played from said playlist as recited in claim 30, wherein said programming information items comprise movies.

37. In an interactive system including a server, an output device, and an input device, a method for indicating the mix of programming information included in a playlist and adjusting the mix of programming information played from said playlist as recited in claim 30, wherein said server comprises a desktop computer and said output device comprises a display.

38. In an interactive system including a server, an output device, and an input device, a method for indicating the mix of programming information included in a playlist and adjusting the mix of programming information played from said playlist as recited in claim 30, wherein said input device is a remote control unit.

39. In an interactive system including a server, an output device, and an input device, a method for indicating the mix of programming information included in a playlist and adjusting the mix of programming information played from said playlist as recited in claim 30, wherein said video output device is a television monitor.

40. In an interactive music system including a server, a video output device, an audio output device and an input device, a method for indicating the mix of songs included in a playlist and adjusting the mix of songs played from said playlist, comprising the steps of:

loading a playlist including a plurality of songs;

loading editorial data associated with said plurality of songs;

displaying on said video output device a predetermined number of indicators;

associating with each of said indicators a category from said editorial data;

setting the position of said indicators to indicate the portion of said plurality of songs corresponding to each of said categories;

adjusting, in response to an input signal from said input device, the position of at least one of said indicators;

selecting songs from said playlist such that the portions of said selected songs associated with each of said categories corresponds to the adjusted positions of said indicators; and playing said selected songs on said audio output device.

41. In an interactive music system including a server, a video output device, an audio output device and an input device, a method for indicating the mix of songs included in a playlist and adjusting the mix of songs played from said playlist as recited in claim 40, wherein associating a category with each of said indicators comprises the steps of:

determining the predominant categories of said categories; and assigning said predominant categories to said indicators.

42. In an interactive music system including a server, a video output device, an audio output device and an input device, a method for indicating the mix of songs included in a playlist and adjusting the mix of songs played from said playlist as recited in claim 41, wherein determining the predominant categories comprises the steps of:

identifying the categories included in said editorial data; and determining the number of songs associated with each of said categories.

43. In an interactive music system including a server, a video output device, an audio output device and an input device, a method for indicating the mix of songs included in a playlist and adjusting the mix of songs played from said playlist as recited in claim 40, wherein selecting songs comprises the steps of:

determining a total number of positions associated with said indicators;

determining a number of positions associated with one of said indicators: and dividing said number of positions by said total number of positions.

44. In an interactive music system including a server, a video output device, an audio output device and an input device, a method for indicating the mix of songs included in a playlist and adjusting the mix of songs played from said playlist as recited in claim 40, wherein said input device is a remote control unit.

45. In an interactive music system including a server, a video output device, an audio output device and an input device, a method for indicating the mix of songs included in a playlist and adjusting the mix of songs played from said playlist as recited in claim 40, wherein said video output device is a television monitor.

* * * * *